Aug. 3, 1948.  G. J. KOEHLER  2,446,334
FLUID VALVE
Filed Feb. 3, 1944
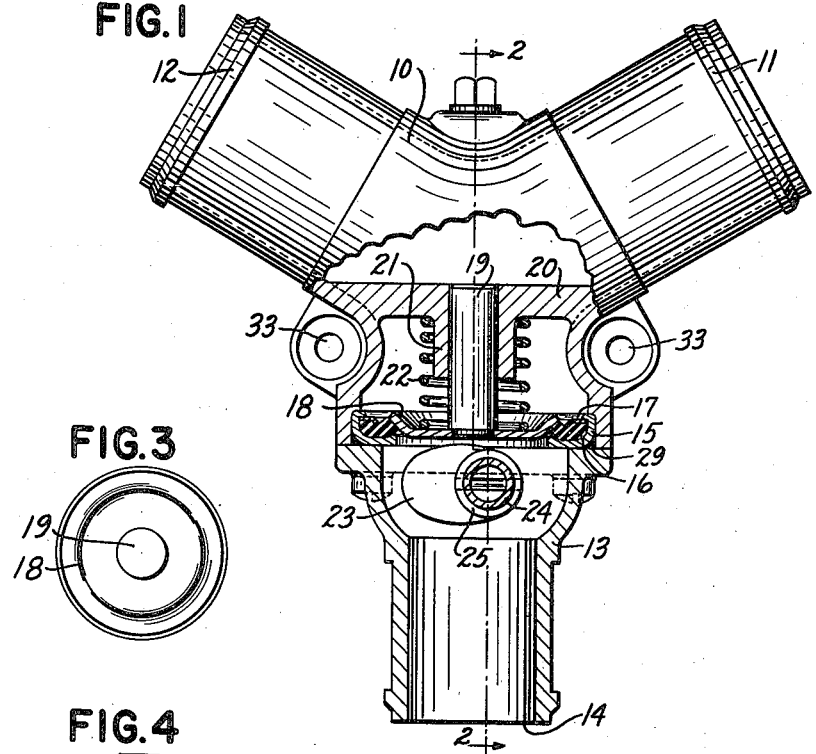
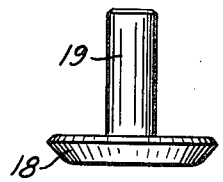
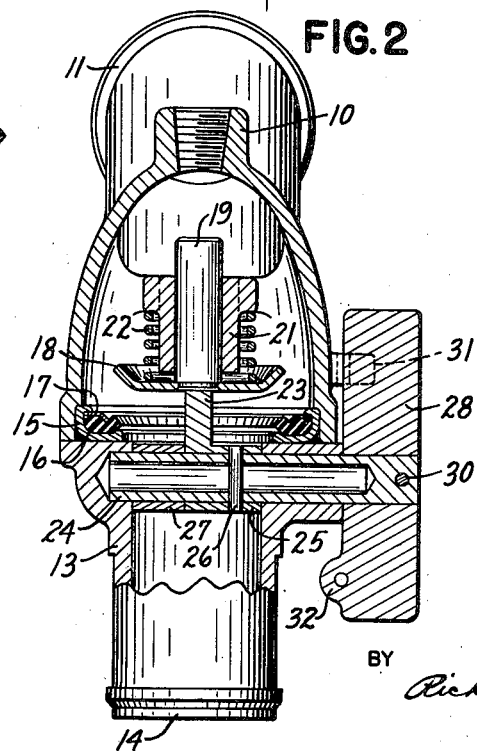
Inventor
GUSTAVE J. KOEHLER
BY
Richard Van Brunn
His Attorney Patented Aug. 3, 1948

2,446,334

UNITED STATES PATENT OFFICE 2,446,334

FLUID VALVE

Gustave J. Koehler, Oakwood, Ohio

Application February 3, 1944, Serial No. 520,884

2 Claims. (Cl. 251—132)

The present invention relates to fluid valves and is particularly directed to a drain valve for use in connection with the lubricating systems of internal combustion engines.

The primary object of the present invention is the provision of a drain valve for use in connection with the lubricating systems of internal combustion engines, said valve being of efficient design, compact form, and minimum weight, and economical to manufacture.

Another object is to provide a drain valve with a unique lifting or opening mechanism to facilitate the draining of lubricating oil from the lubricating system of an internal combustion engine.

A further object is to supply a drain valve with an opening device which is offset with relation to the valve plug or member, so as to provide maximum lift or opening movement of said plug and still retain the overall compact design or form of the valve as a whole.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

In said drawing:

Fig. 1 is a front elevation of the drain valve of this invention, said valve being partially broken away and sectioned to better show the offset construction of the valve opening or lifting mechanism.

Fig. 2 is a vertical sectional view taken along line 2—2 of Fig. 1, looking in the direction indicated by the arrows.

Fig. 3 is a top plan view of the valve plug member.

Fig. 4 is a side elevation of the valve plug member.

Description

The present invention is directed to a valve for use in connection with the lubricating oil circulating systems of internal combustion engines, particularly such engines as those used for operating aircraft and/or watercraft.

Engines of this type usually have a lubricating oil reservoir from which the oil is circulated to the engine bearing surfaces, then back to the reservoir, said lubricating oil being continuously circulated as long as the engine is operating.

The valve of this invention is arranged to be inserted in such a circulating system as that described above and provides a quick and efficient means for thoroughly draining the entire lubricating system in case it is necessary and/or desirable for the examination or replacement of the lubricant.

Referring to the figures of the drawing, and particularly to Figs. 1 and 2, the complete valve is Y-shaped in contour and includes a main body portion 10 having branches 11 and 12 forming a passageway or conduit for connecting in the circulating system of an internal combustion engine to afford continuous flow of lubricant entering one branch of the conduit and leaving by the other branch. The complete valve also comprises a depending auxiliary body portion 13, which is secured to the main body portion by suitable screws. The auxiliary body portion 13 has an outlet branch 14, separated from the circulating branches 11 and 12 by a poppet type of valve mechanism, the opening of which permits the draining of the entire circulating system through the circulating branches 11 and 12 and the outlet branch 14.

The valve mechanism comprises a valve seat unit 15 (Figs. 1 and 2), the outer drum-shaped housing of which fits snugly in a counterbore in the downward portion of the main body portion 10, said counterbore being in axial alinement with the outlet passage 14. The valve seat unit 15 is secured in the counterbore by the auxiliary portion 13 and is sealed in said counterbore against leakage by a suitable medium 29, such as a plastic ring or washer. In addition to the drum-shaped housing, the seat unit 15 comprises a seat washer 16 formed of any suitable material, such as synthetic rubber, and a retaining washer 17 assembled in said housing and secured in place therein by the curled or crimped-over upper edge of said drum-shaped housing.

The valve seat unit described above is similar in every respect to the one disclosed in the co-pending application of Gustave J. Koehler for Letters Patent of the United States, Serial Number 453,629, filed August 5, 1942, now Patent No. 2,348,548 granted May 9, 1944, to which reference may be had for a complete description of said valve seat unit.

The plastic valve seat member 16 has thereon an angular seat surface adapted to be engaged by the external conical surface of an inverted mushroom-shaped valve head 18 (Figs. 1 to 4 inclusive) formed of any suitable material and having secured thereto a stem 19, the circumference of which is slidable in a boring in a web portion 20 of the main body 10. A hub 21, formed on the web 20, provides a guide for a compressible spring 22, inserted between said web 20 and the valve head 18, and said spring is tensioned to maintain the conical face of said head 18 in firm yielding engagement with the angular face on the plastic seat washer 16.

Means for lifting the valve head 18 to open the valve comprises an opening or lifting cam 23 (Figs. 1 and 2) secured on a hollow operating shaft 24 journaled in axially alined borings in the auxiliary body portion 13, said lifting cam having integral therewith a hub portion 25, which is secured by a pin 26 to said hollow shaft 24. A spacing collar 27 free on the shaft 24, in cooperation with the lifting cam 23 and the hub portion 25, properly spaces said cam between the side walls of the auxiliary body portion 13.

A fingerpiece or handle 28 (Fig. 2), secured by a pin 30 on the right-hand end of the shaft 24, is provided for operating said shaft and the lifting cam 23, said handle cooperating with a stop lug 31 on the main body portion 10 when the valve is fully open, as shown in Fig. 2, to terminate the opening movement of said cam 23 and to retain said valve in fully opened position. The handle 28 has a projecting lug 32, which also cooperates with the projection 31 to determine the closed position of the lifting cam 23, said lug having therein a hole which coincides with a similar hole in the projection 31, to provide means for sealing and/or securing the lifting cam 23 in closed position if desired.

By referring to Fig. 1, it will be noted that the horizontal axis of the shaft 24 for the lifting cam 23 is offset in relation to the vertical axis of the stem 19 for the head 18. This and the vertical location of the shaft 24 in relation to the head 18 permit the installation of a lifting cam having a minimum of clearance when the valve is closed (Fig. 1) and providing maximum lifting movement for properly opening the valve (Fig. 2). Thus a cam having the necessary valve lifting or opening characteristics may be installed in a minimum of space and without increasing the overall size or weight of the complete valve. These are features of major importance when the valve is to be used, for example, in the oil circulating system of an aircraft engine, where parts must be of minimum size and weight yet of maximum efficiency. My offset construction provides a valve having maximum opening characteristics, which permits the draining of the lubricant from the circulating system in a minimum of time—an important feature in the case of military aircraft.

Bolt holes 33 (Fig. 1) are provided in the main body portion 10 for securing the complete valve to a suitable support.

The poppet type of drain valve disclosed herein has many advantages over other types of valves when used in the capacity described herein. For example, the poppet valve of this invention is fool-proof and positive in action, in that it has only two positions; namely, wide open and/or closed. The present valve is designed to take advantage of the weight of the lubricating oil to assist in retaining it in closed position. The valve may be opened or closed quickly and easily and will remain in either opened or closed position as long as desired. The offset feature of the horizontal axis of the opening cam 23, in relation to the vertical axis of the valve stem 19 and the vertical location of said cam in relation to the head 18, permits the use of an opening cam having a high lift without increasing the overall size of the body portion of the valve in order to house such a cam properly. The opening cam of high lift provides increased opening movement for the valve plug or head 18, thus facilitating the flow of lubricant being drained from the engine.

From the foregoing it is evident that my contribution to the art provides a device of the character described, possessing the features and advantages hereinbefore enumerated, but, in addition to these features, said device is susceptible of modification in its form, proportions, details of construction, and arrangement of parts without departing from the principle involved or sacrificing any of the advantages thereof.

While the form of mechanism herein shown and described is admirably adapted to fulfill the objects primarily stated, it is to be understood that it is not intended to confine the invention to the one form or embodimen herein disclosed, for it is susceptible of embodiment in various forms all coming within the scope of the claims which follow.

What is claimed is:

1. In a fluid valve of the class described, the combination of a main body portion; an auxiliary body portion removably connected to the main body portion, said auxiliary body portion having an outlet passage connecting with a passage in the main body portion; a valve seat unit mounted in a counterbore in the main body portion and retained in said counterbore by the auxiliary body portion, said seat unit removable when the auxiliary body portion is disconnected from the main body portion; a poppet type valve member comprising an enlarged head cooperating with the seat unit, and a stem portion secured to the head in concentric relationship thereto, said stem shiftably supported in a bore in the main body portion in axial alinement with said seat unit, said valve member removable when the seat unit is removed; yieldable means to urge the head of the valve member into engagement with the seat unit; a shaft journaled in the auxiliary body portion in offset relationship to the axis of the valve member and at right angles thereto, said shaft extending through the outlet passage; an operating cam secured on the shaft and within an enlarged upper portion of the outlet passage, said cam cooperating with the head of the valve member to open and close said member, said cam being constructed and arranged to have a minimum of clearance from said head when the valve member is closed to insure complete closing of said valve member and to obtain maximum opening movement of said valve member; a finger piece secured on one end of the shaft for operating it; and stop means on the main body portion cooperating with the finger piece when it is turned in one direction to locate the cam at the position of its maximum opening movement with respect to the valve member, so as to retain said valve member in open position, said stop means also cooperating with said finger piece when it is turned in the opposite direction to locate said cam in a non-effective position in relation to the valve member to insure that said valve member is in closed position.

2. In a fluid valve of the class described, said valve having a main body portion and an auxiliary body portion removably connected to said main body portion, said auxiliary body portion having an outlet passage connecting with a passage in the main body portion and said main body portion having a counterbore where the two passages meet, the combination of a valve seat unit mounted in the counterbore in the main body portion and retained therein by the auxiliary body portion; a poppet type valve member comprising a head and a stem secured to said head in concentric relationship thereto, said head cooperating with the seat until to control the flow of fluid and said stem being shiftably supported in axial alinement with the seat unit in a bore in the main body portion, said valve member being removable when the seat unit is removed; yieldable means to urge the head of the valve member into engagement with the seat unit; a shaft journaled in the auxiliary body portion at right angles to and in offset relationship to the axis of the valve member, said shaft extending through the outlet passage; a cam secured on the shaft and within an enlarged upper portion of the outlet passage, said cam cooperating with the head of the valve member to open and close said member, said cam being constructed and arranged to have a minimum of clearance from said head when the valve member is closed to insure complete closing of said valve member and to obtain maximum opening movement of said valve member; a turning piece secured on one end of the shaft and operable to turn the shaft and the cam to move the valve member to open and closed positions; and a stop on the main body portion cooperating with the turning piece, when it is turned in one direction, to stop the cam at the extremity of its opening movement and in diametrical opposition with respect to the valve member, to hold said valve member in open position, said stop means also cooperatinog with said turning piece when it is turned in the opposite direction to stop the cam at the extremity of its closing movement to insure that the valve member is closed.

GUSTAVE J. KOEHLER.

REFERENCES CITED

The following references are of record in the file of this patent:

UNITED STATES PATENTS

| Number | Name | Date |
|---|---|---|
| 1,264,293 | Gower | Apr. 30, 1918 |
| 1,346,289 | Wilber | July 13, 1920 |
| 1,568,236 | Pearne | Jan. 5, 1926 |
| 1,758,419 | Wheaton | May 13, 1930 |
| 1,825,124 | Pierret | Sept. 29, 1931 |
| 1,839,663 | Fehn | Jan. 5, 1932 |
| 2,226,843 | Carlson | Dec. 31, 1940 |